United States Patent
Wang et al.

(10) Patent No.: US 8,102,787 B2
(45) Date of Patent: Jan. 24, 2012

(54) MAC LAYER TIMESTAMPING APPROACH FOR EMERGING WIRELESS SENSOR PLATFORM AND COMMUNICATION ARCHITECTURE

(75) Inventors: Shu Wang, Richardson, TX (US); Tae-Won Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 838 days.

(21) Appl. No.: 12/213,286

(22) Filed: Jun. 17, 2008

(65) Prior Publication Data

US 2009/0310572 A1  Dec. 17, 2009

(51) Int. Cl.
*H04B 7/00* (2006.01)
(52) U.S. Cl. ........................................ 370/310
(58) Field of Classification Search .................. 370/310, 370/328–321, 312, 349, 350, 464, 465, 474, 370/507–514; 709/248
See application file for complete search history.

(56) References Cited

U.S. PATENT DOCUMENTS

| | | | |
|---|---|---|---|
| 6,510,150 B1 * | 1/2003 | Ngo | 370/347 |
| 7,058,071 B1 * | 6/2006 | Myles et al. | 370/419 |
| 7,151,945 B2 * | 12/2006 | Myles et al. | 455/502 |
| 7,545,794 B2 * | 6/2009 | Loukianov | 370/350 |
| 7,860,125 B2 * | 12/2010 | Bains et al. | 370/469 |

OTHER PUBLICATIONS

Shu Wang "TSM Technical Final Report—Development of Wireless Mesh/Relay Networking Protocols for U-computing" Nov. 22, 2007; (Copyright—2005 Samsung Electronics Co., Ltd.), pp. 1 23.
"Part 15.4: Wireless Medium Access Control (MAC) and Physical Layer (PHY) Specifications for Low-Rate Wireless Personal Area Networks (WPANs)", IEEE 2006, pp. 1-26.

* cited by examiner

*Primary Examiner* — Dmitry H Levitan (57) ABSTRACT

In the receiving side MAC layer timestamping approach, the MPDU structure is changed by adding an extra timestamping field. When a MPDU packet is generated, a captured receiving timestamp is written into the MPDU's timestamp field. The MPDU packet is then forwarded from the PHY to the MAC layer of the wireless sensor node. In the MAC layer, the receiving timestamp is further processed and inserted into a corresponding field of the time synchronization message, which is in turn transmitted to a Time Synchronization module. In the sending side MAC layer timestamping approach, the sending timestamp is captured immediately before the time synchronization message is written into TxFIFO.

20 Claims, 11 Drawing Sheets

PRIOR ART

FIG. 4

PRIOR ART

FIG. 5

PRIOR ART

FIG. 7

MPDU structure

| Length | Frame Control | Sequence Number | Data | Timestamp |
|---|---|---|---|---|

FIG. 8

Time Synchronization Message Structure

| Type | Sender Address | Sequence number | Clusterhead address | Global Timestamp | Local Timestamp |
|---|---|---|---|---|---|

MAC LAYER TIMESTAMPING APPROACH FOR EMERGING WIRELESS SENSOR PLATFORM AND COMMUNICATION ARCHITECTURE

BACKGROUND OF THE INVENTION

1. Field of the Invention

The present invention relates to methods and apparatus for MAC-layer timestamping in a wireless sensor platform.

2. Description of the Related Art

The present invention incorporates by reference the following publications:

[1] IEEE Standard for Information technology, Part 15.4: Wireless Medium Access Control (MAC) and Physical Layer (PHY) Specifications for Low-Rate Wireless Personal Area Networks (WPANs); and

[2] Time Synchronization Module S/W Detailed Level Design Version 1.1 by Samsung Telecommunications America.

TinyOS-based Wireless Sensor Networks (WSNs) are transitioning to real-world applications (e.g. TinyDB, Arch Rock Primer Pack/IP, Crossbow Wireless Sensor Network), and expected to become more prevalent in our everyday life. The values of WSN reply on their low energy consumption, low cost, easy deployment, and interoperability in large numbers. To achieve these, new devices and new communication stacks are being developed. Recently, a few of vendors have released 8051-based System on a Chip (SoC) sensor motes (e.g TI CC2430/MicrotrollerUnit (MCU) 8051, CC2431/ MCU8051), which combines radio and MCU at low cost. Due to the new release, TinyOS community formed a new working group, "TinyOS 8051 Working Group" in March, 2005 and is working on porting NesC and TinyOS to the 8051 microcontroller platform.

To support the interoperability, low cost, and low power consumption requirements, a new IEEE 802.15.4 standard has also been proposed recently. The IEEE 802.15.4 standard defines the physical and medium access layer (MAC) for wireless personal area networks (WPANs). The IEEE 802.15.4 standard is compliant with Zigbee. The ZigBee Alliance—an organization with more than 150 company members—has been working in conjunction with the IEEE Task Group 15.4 in order to specify a full protocol stack for WPANs. So IEEE 802.15.4 is establishing its place on the market as enablers of the pervasive, interoperable wireless sensor networks (WSNs).

The emerging new devices (8051 platform) and new communication stacks (802.15.4) bring new challenges to TinyOS-based WSN, especially for MAC-layer timestamping based time synchronization. The MAC-layer timestamping based time synchronization is both hardware-dependent and MAC/Physical Layer (PHY)-layer dependent. Time synchronization (TS) is a critical piece of infrastructure for WSN. Many applications in WSN need synchronized time (for data fusion, TDMA schedules, synchronized sleep periods, etc.). To meet the high-accuracy synchronization requirement, MAC layer timestamping is needed to eliminate and reduce non-deterministic factors. In MAC-layer timestamping based time synchronization, Time Synchronization module directly time-stamps packets at the MAC/PHY layer, thus the non-determinism of send and/or receive time can be reduced, resulting in high precision performance.

All previous works (e.g. Flooding Time Synchronization Protocol (FTSP) on Mica and Telos) realizes MAC-layer timestamping only on Mica Atmel (AVR) MCU platform and Telos TI MSP430 MCU platform and only through TinyOS default communication stack. The existing approaches for MAC-layer times-stamping are not applicable to the WSN with the new hardware and new 802.15.4 stack. In addition, traditional MAC-layer stamping approaches have been only tested on the application with one single Time Synchronization module, not in a large software system with multiple modules and multiple messaging. The traditional MAC-layer stamping approach is not scalable. In the traditional MAC-layer timestamping approach, Start-of-frame delimiter (SFD) signal events are created for every sent/received message in the interrupt handling context, and are directly given to time synchronization module for further processing. If there are multiple modules in a large software system and multiple messaging (e.g. a lot of broadcast messages), every node may receive/send multiple messages in a very short time and the SFD signal event in the interrupt context will be created for every sent/received message. In this case, the code needed to run in the interrupt handlers will be too large, the interrupts will be lost or queued, which eventually affects the whole system stability and results in node hanging in the worst case.

SUMMARY OF THE INVENTION

It is therefore an object of the present invention to provide an improved method and apparatus for MAC-layer times-tamping.

It is another object of the present invention to provide an improved method and apparatus for MAC-layer timestamping that is compatible with the new software and hardware platform.

It is still another object of the present invention to provide an improved method and apparatus for timestamping with minimum performance overhead.

According to one aspect of the present invention, a message is received at a physical layer (PHY) of a wireless node. The message includes a Start-of-Frame-Delimiter field. A receiving timestamp is captured at the end of receiving the Start-of-Frame-Delimiter field when a SFD interrupt is created. A medium access control (MAC) protocol data unit (MPDU) packet is generated to include the message and a timestamping field. The captured receiving timestamp is inserted into the timestamping field of the medium access control protocol data unit (MPDU) packet, which is subsequently forwarded from the physical layer (PHY) of the wireless sensor node to the medium access control (MAC) layer of the wireless sensor node. In the medium access control (MAC) layer, it is determined whether the message in the medium access control protocol data unit (MPDU) packet is a time synchronization message. If the message in the data packet is a time synchronization message, the receiving timestamp is inserted into a timestamping field of the time synchronization message. Finally, the time synchronization message is transmitted from the medium access control (MAC) layer of the wireless sensor node to a Time Synchronization module (TSM) of the wireless sensor node.

According to another aspect of the present invention, a time synchronization message is generated at a wireless sensor node in a wireless network. When the time synchronization message is to be written into the TxFIFO data buffer of the wireless sensor node, a sending timestamp is captured and embedded into the time synchronization message right before the time synchronization message is written into the TxFIFO data buffer. The time synchronization message embedded with the sending timestamp is then sent out from the TxFIFO buffer of a wireless sensor node.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
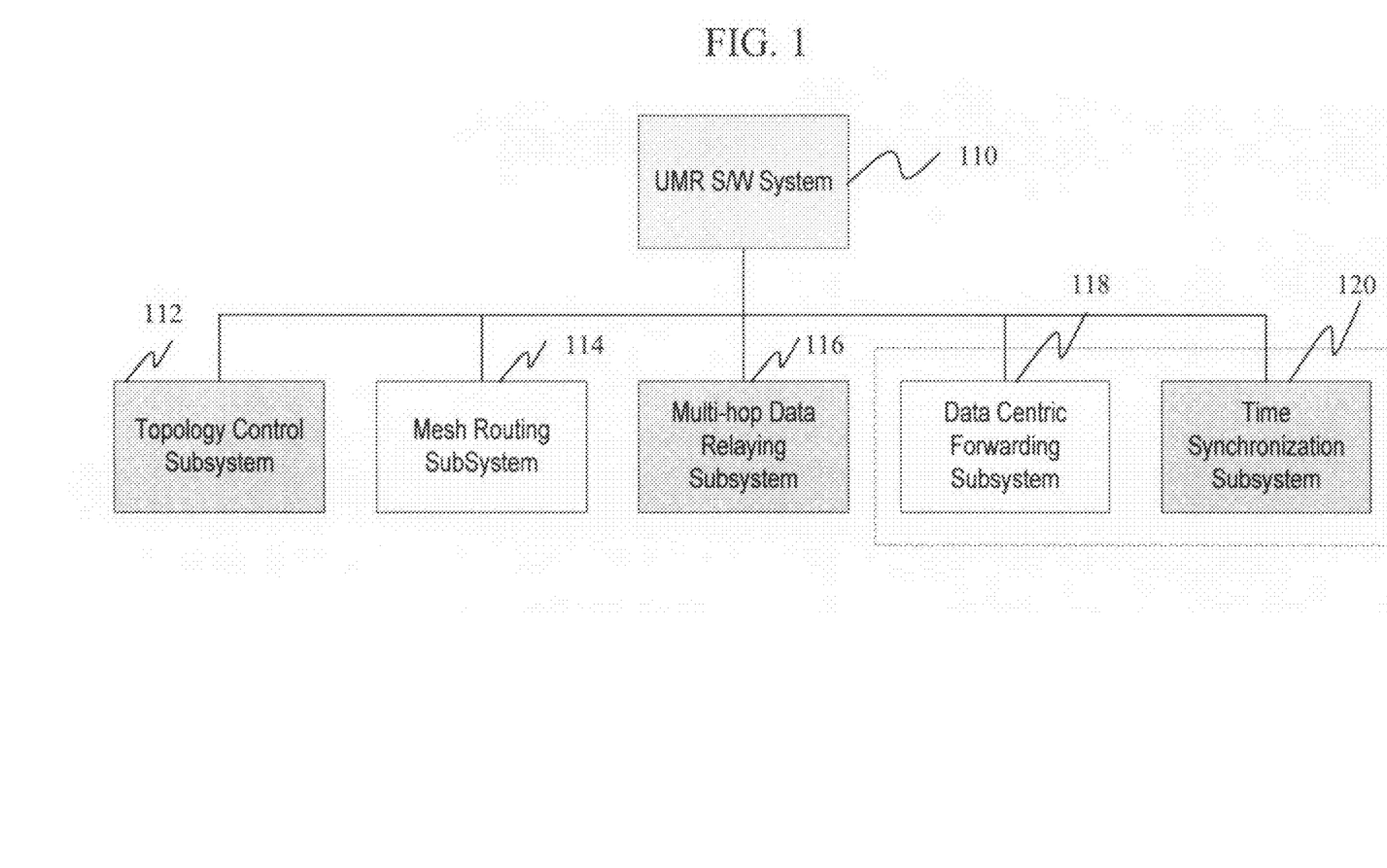
FIG. 1 schematically illustrates the block architecture of a software system in a sensor node in a Ubiquitous Sensor Network (USN)

FIG. 1 schematically illustrates the block architecture of a Ubiquitous Sensor Network (USN) Mesh/Relay (UMR) software system we implemented in a sensor node. The UMR software system is developed for USN to provide intelligent, efficient, reliable and scalable USN networking framework using Topology control, Mesh Routing, Multi-hop Data Relaying, Data Centric Forwarding, and Time Synchronization based on IEEE 802.15.4 and TinyOS technologies. As shown in FIG. 1, a sensor node is constructed with UMR software system 110. Network Topology Control module 112 is in charge of topology formation and connectivity of sensor nodes, and provides the topology information that will be used by Mesh Routing module 114 of the sensor network. Mesh Routing module 114 is in charge of the route discovery, recovery and optimization. Multi-hop Data Relaying module 116 is in charge of the classification of Medium Access Control (MAC) frames and Adaptive Link Control (ALC) between sensor nodes. These functions provide the redistribution of up-link MAC frames from MAC layer and the reliable transport based on link quality and application data information. Data Centric Forwarding module 118 is used for sensor data aggregation. Time Synchronization module 120 is used for time synchronization to providing Network Time (or Global time) service to sensor nodes based on local time at the Sink node.

Figure 2:
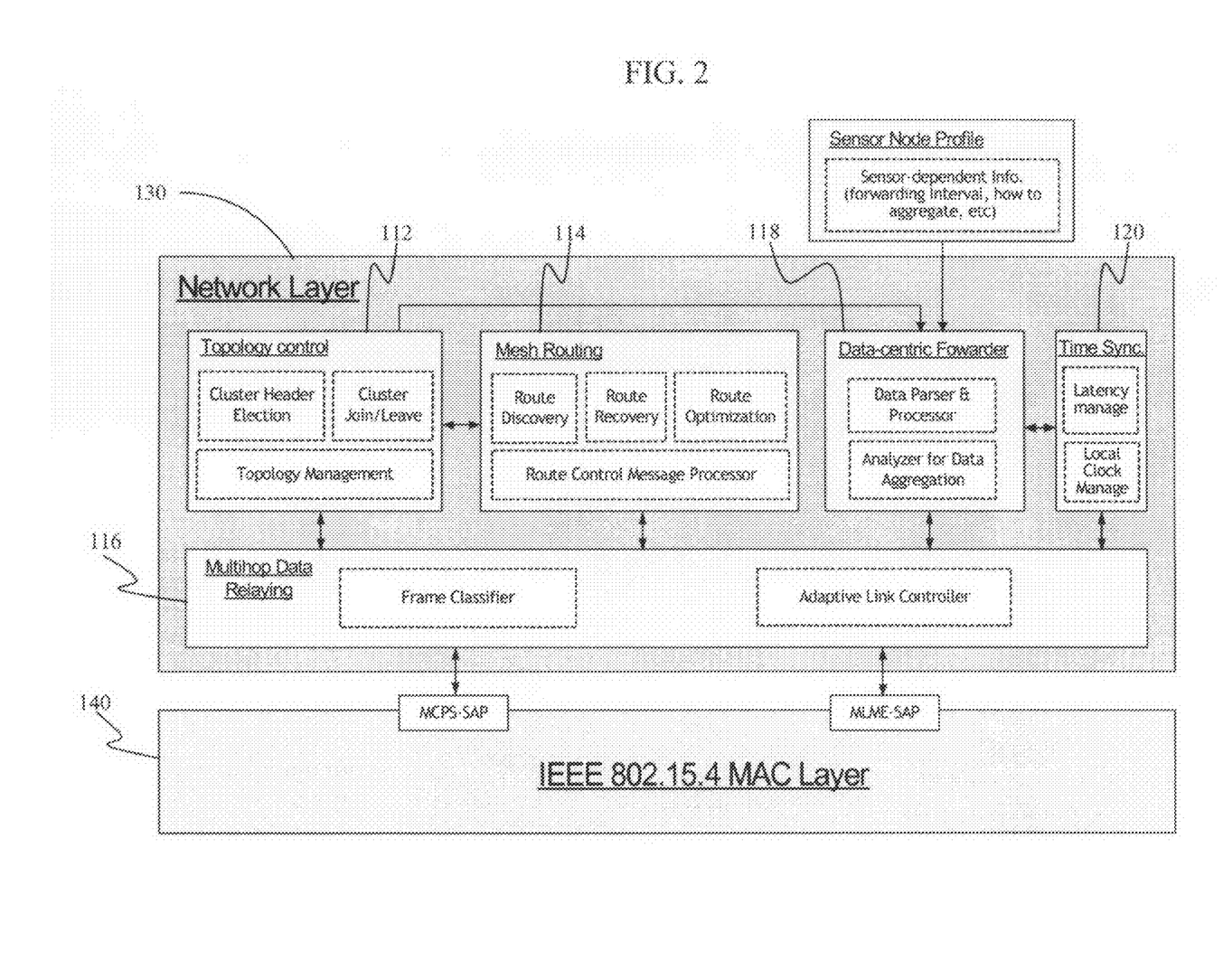
FIG. 2 schematically illustrates the structure of network stack of the UMR software system.

FIG. 2 schematically illustrates the structure of network stack of the UMR software system. As shown in FIG. 2, Topology Control module 112, Mesh Routing module 114, Data Centric Forwarding module 118, and Time synchronization module 120 are located in network layer 130, and communicate with MAC layer 140 via Multi-hop Data Relaying module 116 located in network layer 130.

Before we start explaining the sending-receiving process of the MAC-layer timestamping approach, we will first introduce frame structures. In the IEEE 802.15.4 standard, frame structures have been designed to keep the complexity to a minimum while at the same time making them sufficiently robust for transmission on a noisy channel. Each successive protocol layer adds to the structure with layer-specific headers and footers. According to the IEEE 802.15.4 standard, a data frame is used for the transfer of data.

Figure 3:
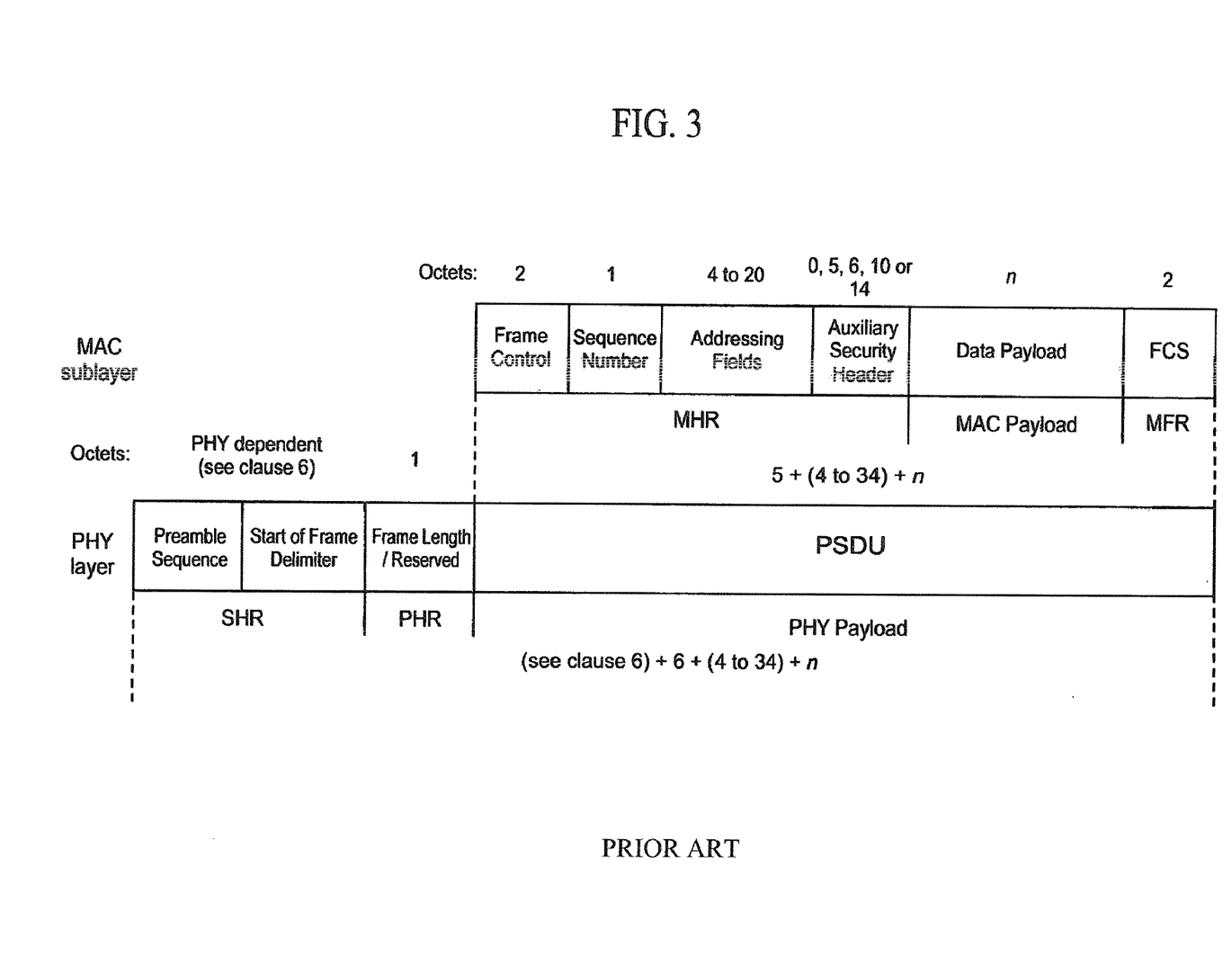
FIG. 3 schematically illustrates the structure of the MAC-layer data frame and the PHY packet.

FIG. 3 schematically illustrates the structure of the MAC layer data frame, which originates from the upper layers (e.g. network layer or application layer). The data payload is passed to the MAC sublayer and is referred to as the MAC service data unit (MSDU). The MAC payload is prefixed with a MAC header (MHR) and appended with an MFR). The MHR contains the Frame Control field, data sequence number (DSN), addressing fields, and optionally the auxiliary security header. The MFR is composed of a 16-bit FCS. The MHR, MAC payload, and MFR together form the MAC data frame, (i.e., MPDU). The MPDU is passed to the PHY as the PSDU, which becomes the PHY payload. The PHY payload is prefixed with a synchronization header (SHR), containing the Preamble Sequence and Start-of-frame delimiter (SFD) fields, and a PHY header (PHR) containing the length of the PHY payload in octets. The preamble sequence and the data SFD enable the receiver to achieve symbol synchronization. The SHR, PHR, and PHY payload together form the PHY packet, (i.e., PPDU).

Figure 4:
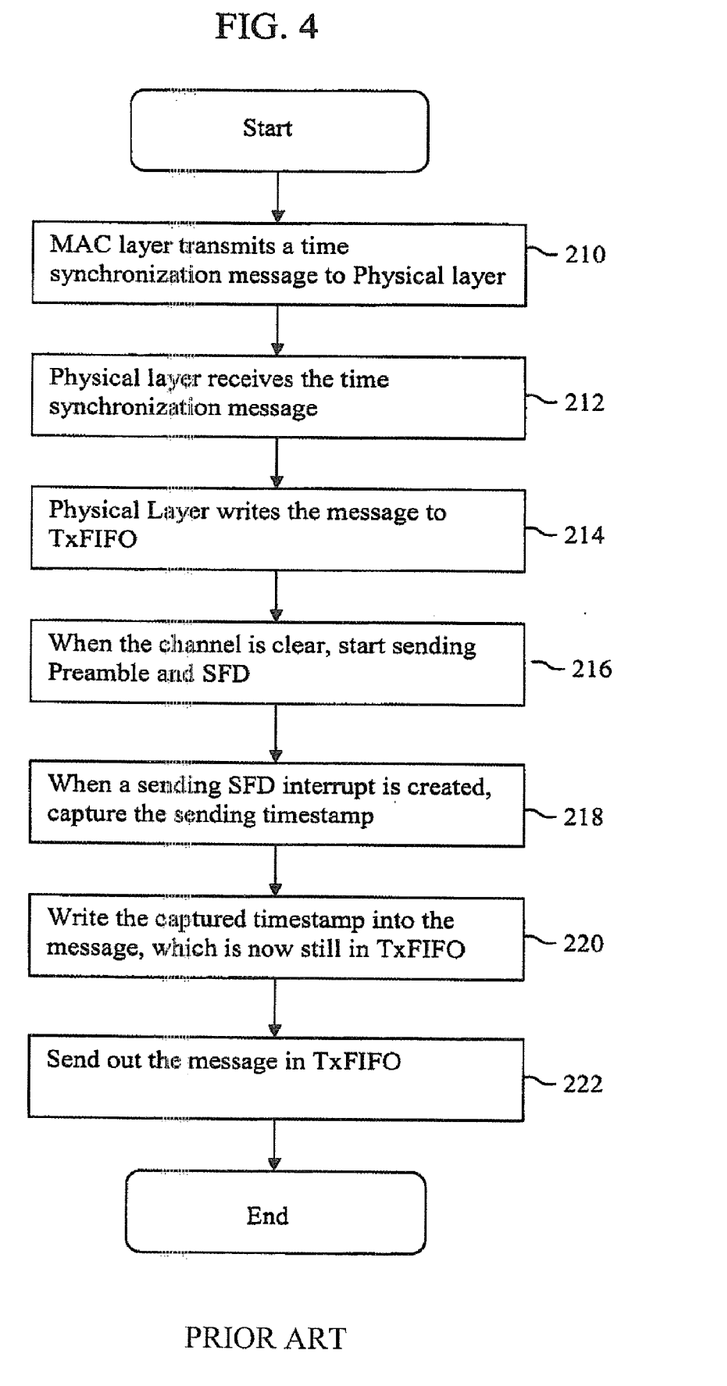
FIG. 4 is a flow chart outlining a sending process for a traditional MAC layer time-stamping approach using TinyOS default stack.

FIG. 4 is a flow chart outlining a sending process for a traditional MAC layer time-stamping approach using TinyOS default stack. First, a time synchronization message is generated by the time synchronization module of a wireless sensor node and is transmitted to its MAC layer. The MAC layer then transmits the time synchronization message to the Physical (PHY) layer via step 210. When the PHY layer receives the time synchronization message via step 212, the PHY Layer writes the message to a TxFIFO data buffer via step 214. The node observes a channel condition, and when the channel is clear, the node starts sending the preamble and the SFD via step 216. Immediately after the SFD field is transmitted, a sending SFD interrupt is created. A SFD interrupt is a hardware interrupt which triggers the lowest level event in TinyOS systems. When the sending SFD interrupt is created, the node captures a timestamp via step 218, and writes the captured timestamp into the time synchronization message stored in the TxFIFO via step 220 by using a function "writeToTxFIFO". Then, the node transmits the time synchronization message attached with the timestamp from the TxFIFO via step 222.

We have tested the sending process of the traditional timestamp approach in a new platform with CC2431 as the Radio Chip, 8051MCU as the processor, and TinyOS 2.0 as the operating system. The new platform, however, does not support step 220, i.e., the functionality of writeToTxFIFO, thus resulting in the instability of the whole system.

Figure 5:
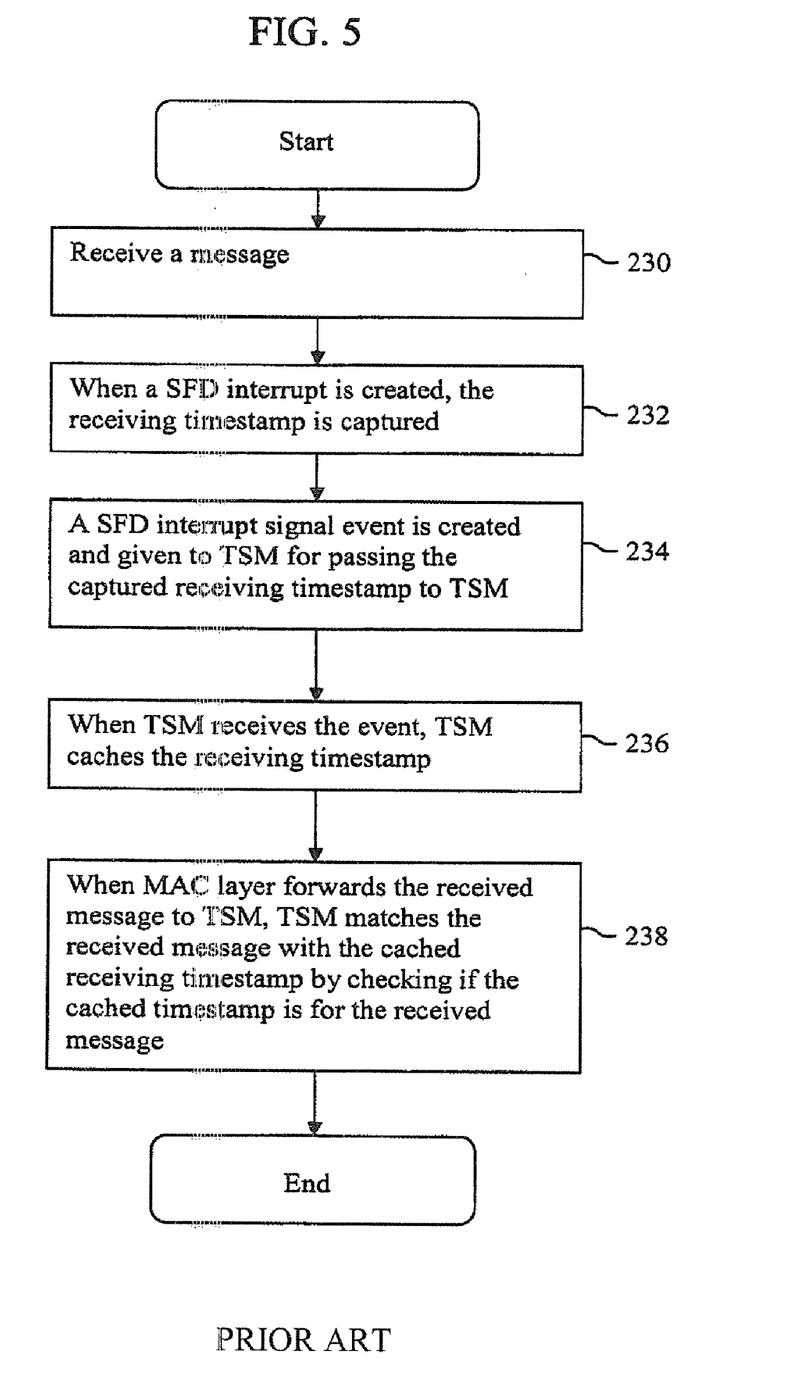
FIG. 5 is a flow chart outlining a receiving process for a traditional MAC layer time-stamping approach using TinyOS default stack.

FIG. 5 is a flow chart outlining a receiving process for the traditional MAC-layer time-stamping approach using TinyOS default stack. When a wireless node receives a time synchronization message, the message is received at the MAC/PHY layer via step 230. The MAC/PHY layer is the TinyOS default stack. Immediately after the SFD field of the time synchronization message is received, a SFD interrupt is created, and a receiving timestamp is captured by the node via step 232. Then, a SFD signal event will be created and signaled to the Time Synchronization module (TSM) via step 234. The aim of the SFD signal event is to pass the captured receiving timestamp to the Time Synchronization module (TSM). In the signal event, the passed parameters include the captured receiving timestamp and a message pointer specifying to which message the timestamp corresponds. When the Time Synchronization module (TSM) receives the event, the Time Synchronization module (TSM) caches the captured receiving timestamp and the message pointer via step 236. When the MAC/PHY layer forwards the received message to the Time Synchronization module (TSM), the Time Synchronization Module (TSM) matches the received message with the cached timestamp by checking if the message pointer for the cached timestamp corresponds to the received message, via step 238.

The receiving process of the traditional time-stamping approach has the following disadvantages. First, the SFD interrupt signal events are under hardware context and preempt other tasks or interrupts. When a large software system is constructed with multiple sub-modules, a lot of messages may be generated and need to be transmitted. A sensor node can receive multiple messages in a very short time, thus creating a lot of signal events. This will preempt other tasks and hardware interrupts, and eventually will cause the whole system unstable or undesirably hang up.

We have developed a new MAC-layer-timestamping approach for the WSN with the new hardware platform (MCU8051 platform, see Table 1) and the new TinyOS-2.0 based 802.15.4 stack. We identified the new hardware platform features and boundaries, and designed the new MAC-layer timestamping approach based on it. We implemented and tested the MAC-layer time-stamping approach using the Time Synchronization algorithm of our Data Centric Project.

The features of the new MAC-layer timestamping approach are:

The new MAC-layer timestamping approach is the first implementation of MAC layer timestamping on TinyOS 2.0-based IEEE 802.15.4 stack and MCU-8051 platform. The new MAC-layer timestamping approach has minimum performance overhead, i.e., no SFD signal events are created like traditional MAC layer timestamping approach. All the sending/receiving timestampings are embedded and written into packets within 802.15.4 layers.

The new MAC-layer timestamping approach is Zigbee protocol compliant and support Zigbee protocols The new MAC-layer timestamping approach is scalable. It has been integrated into large UMR software system which consists of multiple modules (e.g. Topology Control, Mesh Routing, Data Centric Forwarding)

The specific details for the new MAC layer timestamping approach are described as follows.

For the sending side MAC layer timestamping approach, we identified the 8051 platform boundaries, and proposed a feasible approach for sending-side MAC layer timestamping. The traditional approach captures the sending timestamp when the SFD interrupt of a sending message is created and inserts the captured timestamp into the message being saved in TxFIFO. The current hardware platform, however, doesn't support the functionality of writeToTxFIFO since the functionality of writeToTxFIFO causes the instability of the whole system.

Based on this, we proposed a new MAC layer timestamping approach for the sending side. That is, in the sending side's PHY layer, we add sending time stamp into the time synchronization message right before the time synchronization message is written into the TxFIFO. Here, right before refers to immediately before, i.e., there is no interval of time between adding the sending time stamp into the time synchronization message and writing the synchronization message into the TxFIFO. The sending timestamp is furthered corrected by applying statistical correction. By using this approach, the sending timestamp is directly embedded into

TABLE 1

The New MAC layer Timestamping Hardware Platform.

| Category | | Processor Board | Note |
|---|---|---|---|
| General Features | Main Component | CC2431 | MCU + RF Transceiver(SOC) |
| | Processor | 8-bit 8051 | |
| | OS | TinyOS 2.0 | |
| | Board Size | 50 × 25 mm | |
| Memory | Internal Memory | 128 KB Flash/8 KB SRAM | |
| | External Memory | 16 Mbit EEPROM | Serial Flash (SPI Interface) |
| RF Transceiver | Frequency Range | 2400~2483.5 MHz | Heterodyne Receiver Without PA |
| | Transmit Power | 0 dBm (1 mW) | |
| | Transmit Data Rate | 250 kbps | |
| | Receiver Sensitivity | −91 dBm | |
| | Antenna | External Dipole Antenna (2 dB) | SMA type connector |
| | Range (LOS) | 170 m | Ref. CC2430 DBK |
| Miscellaneous | Current Consumption | 26.9 mA | Maximum. RF Active |
| | Power Supply | 2 × (1.5 V Battery) | AA size |
| | Interface | 40-pin connector | Power, Download, Debugging | the message. We applied stability and stress test. This approach shows to be the most stable approach in the current hardware platform.

Figure 6:
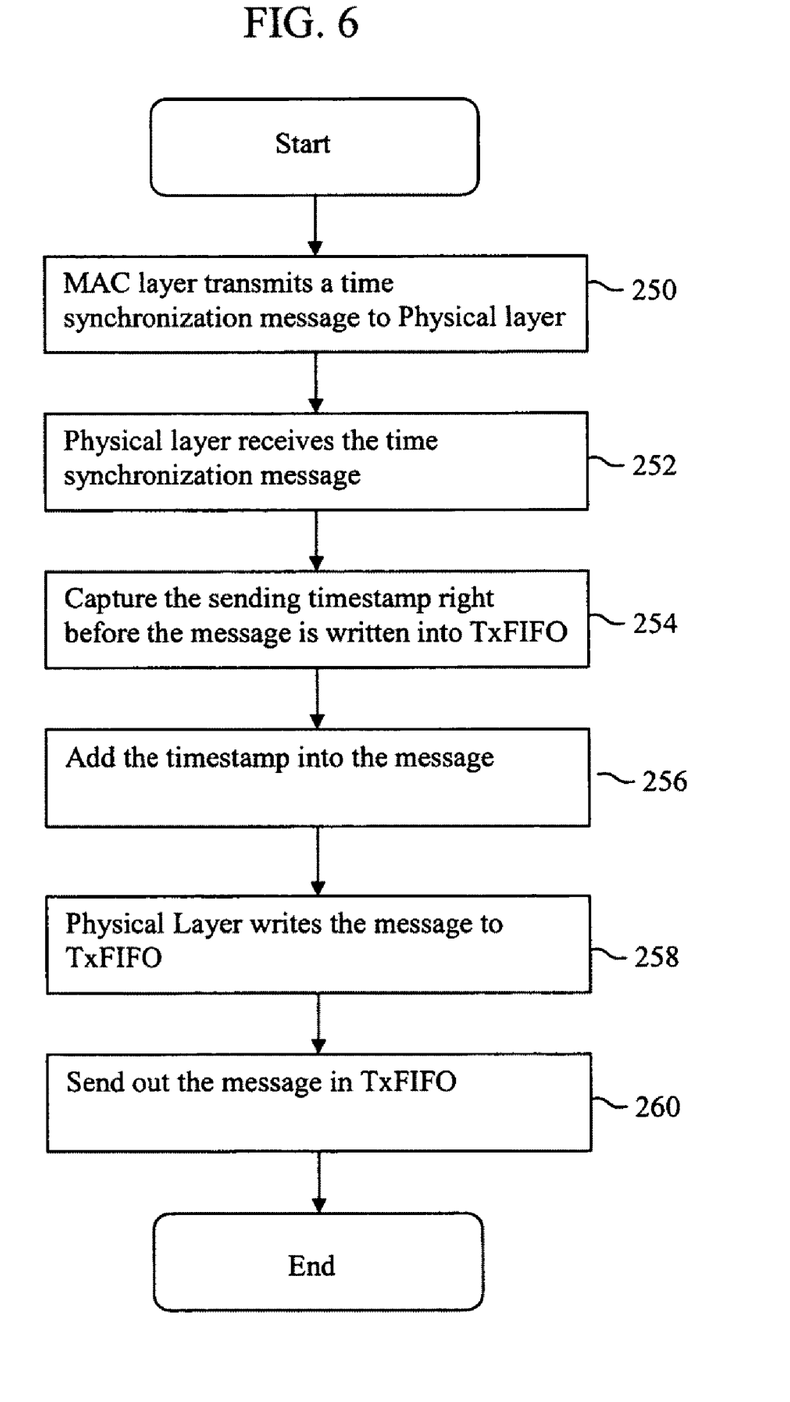
FIG. 6 is a flow chart outlining a sending process for the MAC layer time-stamping approach as an embodiment according to the principles of the present invention.

Specifically, FIG. 6 illustrates a flow chart outlining a sending side MAC layer time-stamping approach as an embodiment according to the principles of the present invention. First, a time synchronization message is generated by the time synchronization module of a wireless sensor node and is transmitted to the MAC layer. The MAC layer transmits the time synchronization message to the Physical (PHY) layer via step 250. When the PHY layer receives the time synchronization message via step 252, the node captures a sending timestamp right before the message is written into the TxFIFO data buffer, via step 254. The node attaches the captured sending timestamp into the message via step 256. Then, the PHY layer writes the message attached with the sending timestamp into the TxFIFO 258. Finally, the node transmits the time synchronization message attached with the timestamp from the TxFIFO via step 260.

For the receiving side MAC layer timestamping approach, different from the traditional MAC layer timestamping approach, our approach does not create a receiving SFD signal event for each received message, since this will cause too much performance overhead and eventually will cause instability of the whole system. In our approach, a SFD receiving timestamp is directly embedded into the IEEE 802.15.4 data packet and no extra process/task overhead is needed.

Figure 7:
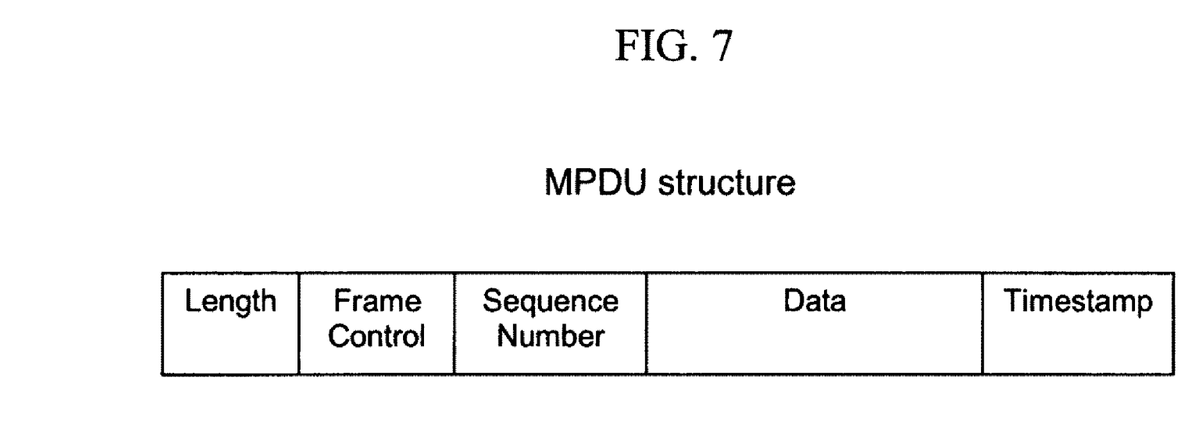
FIG. 7 schematically illustrates the new structure of the MPDU packet according to the principles of the present invention.

Specifically, this is realized as follows. First, we propose to change the MAC Protocol Data Unit (MPDU) structure definition by adding an extra timestamping field into the MPDU structure definition. FIG. 7 schematically illustrates the structure of the new MPDU packet according to the principles of the present invention. The new MPDU packet includes, but not limited to, a Length field, a Frame Control field, a Sequence Number field, a Data field and a Timestamp field.

Then, in the PHY layer, the receiving timestamp of a received message is cached/written into the MPDU packet's time-stamping field. When a MPDU packet is transmitted from the PHY layer to the MAC layer, the timestamp cached within MPDU can be further processed in MAC layer. The MAC layer checks whether the message in the MPDU packet is a time synchronization message. If the message is a time synchronization message, the receiving timestamp is written into the corresponding field in the time synchronization message.

Figure 8:
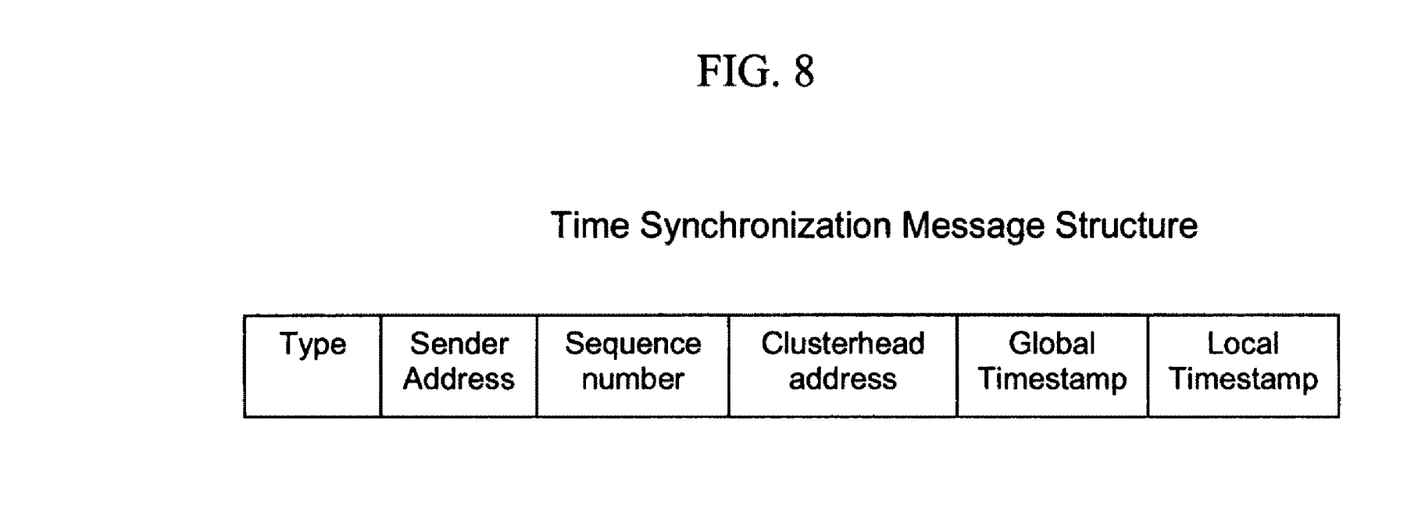
FIG. 8 schematically illustrates an example of a time synchronization message structure, which includes Global Timestamp and Local Timestamp fields.

FIG. 8 schematically illustrates the structure of a time synchronization message used in our Data Centric Project. The time synchronization message includes a Global Timestamp field, and a Local Timestamp field. The TSM we implemented in the UMR software system supports multi-hop synchronization. The root of the network, the sink node (SINK), maintains the global time and all other nodes synchronize their clocks to that of the SINK. The TSM utilizes a broadcast message to synchronize the possibly multiple receivers to the time provided by the sender of the message. The broadcasted message contains the sender's time stamp which is the estimated global time (global timestamp) at the transmission of the given message. The receivers obtain the corresponding local time (local timestamp) from their respective local clocks at message reception. Consequently, one broadcast message provides a synchronization point (a global-local time pair) to each of the receivers. When a sender periodically broadcasts a time synchronization message, each receiver caches multiple synchronization points and performs linear regression based on the cached multiple synchronization points to estimate its clock's skew and an offset. The relationship between local time and global time based on the estimated skew and offset is represented as follows:

$$Global\_time = Skew \times Local\_time + Offset \quad (1)$$

By using the estimated skew and offset, a node can covert its local time to global time.

Figure 9:
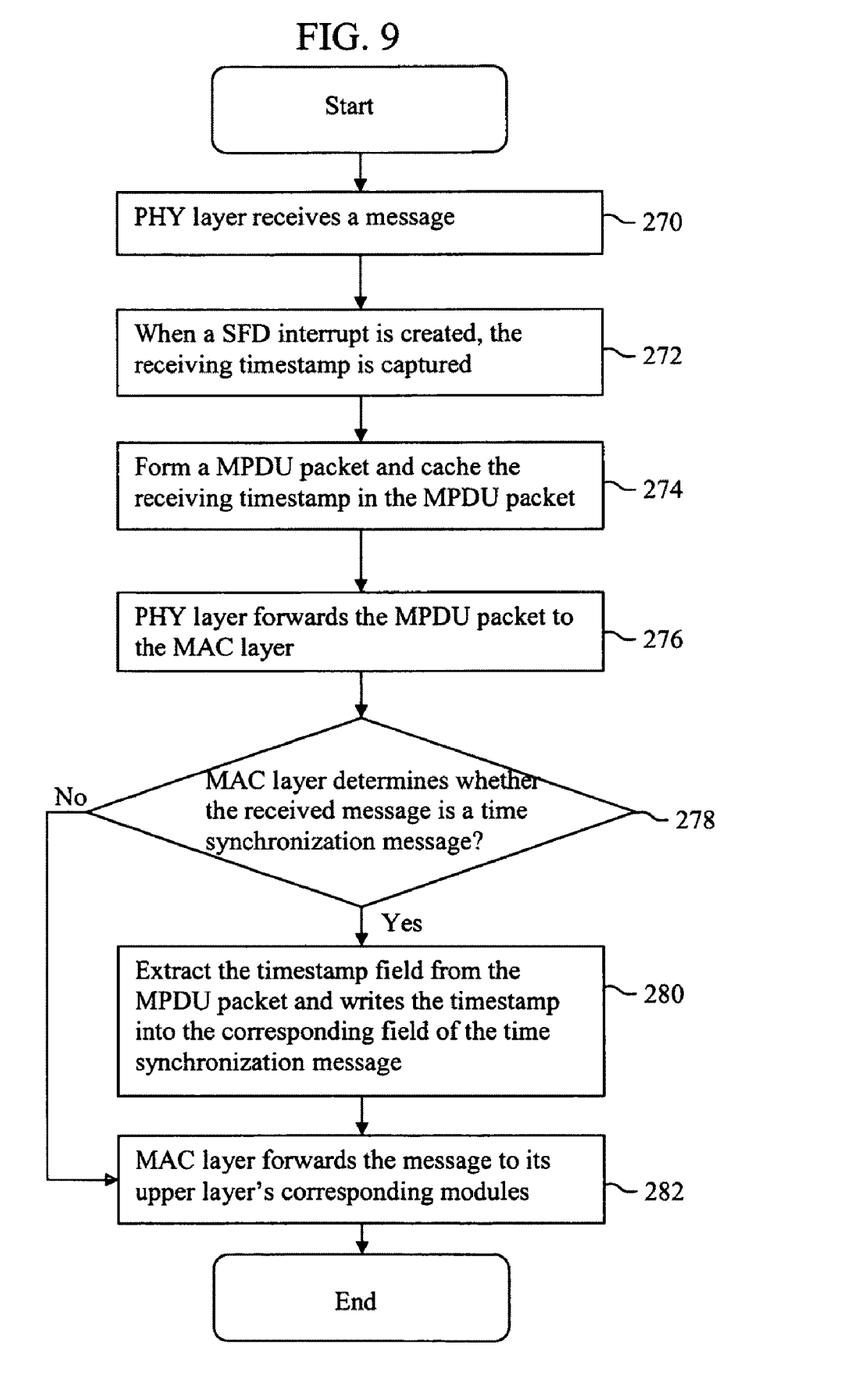
FIG. 9 is a flow chart outlining a receiving process for the time-stamping approach as an embodiment according to the principles of the present invention.

FIG. 9 is a flow chart outlining a receiving process for the time-stamping approach as an embodiment according to the principles of the present invention. When a wireless node receives a time synchronization message, the message is received at the PHY layer via step 270. Immediately after the SFD field of the time synchronization message is received, a SFD interrupt is created, and a receiving timestamp is captured via step 272. Then, a MPDU packet is formed to include the received message, and the captured receiving timestamp via step 274. Note that the MPDU packet in the present invention includes a timestamping field. The PHY layer subsequently forwards the MPDU packet to the MAC layer via step 276. In the MAC layer, the received message and the receiving timestamp contained in the MPDU packet are extracted, and a determination is made about whether the extracted message is a time synchronization message via step 278. If the received message is a time synchronization message, the receiving timestamp is written into the corresponding field of the time synchronization message via step 280. Finally, the received message extracted from the MPDU packet is forwarded from the MAC layer to an upper layer corresponding module via step 282. In the case that the received message is the time synchronization message, the time synchronization message is forwarded to the Time Synchronization module via step 282.

By using the above process, when the Time Synchronization module receives a packet from MAC, the received timestamp has already been embedded within the messages. No extra tasks are needed, which reduces the interrupt handling overhead and ensures the whole system's stability and scalability.

Figure 10:
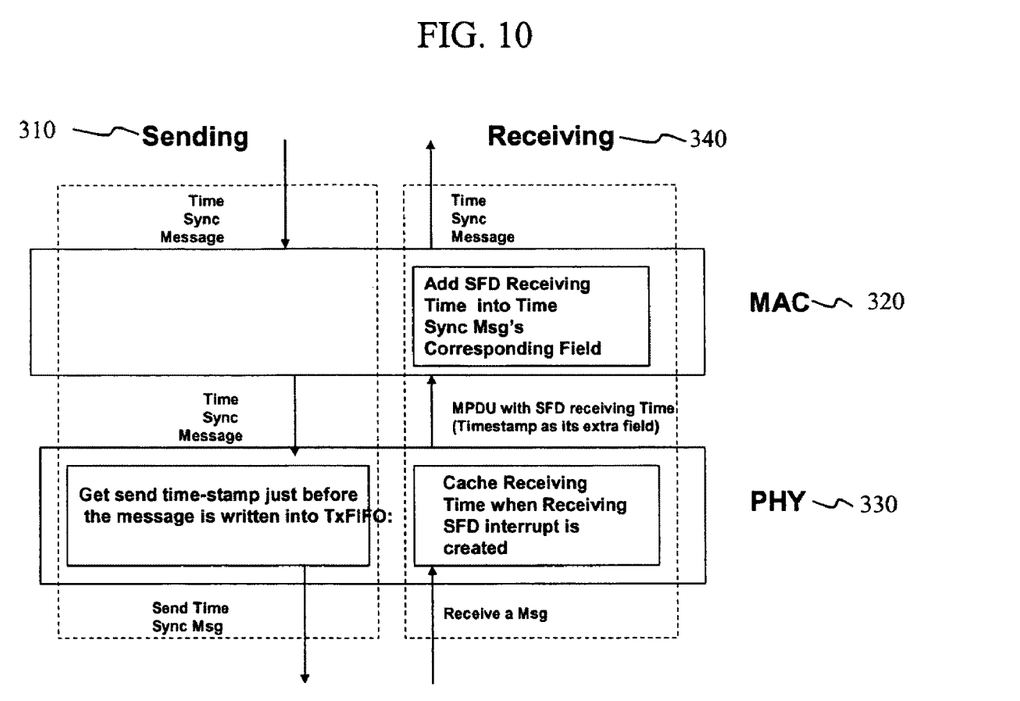
FIG. 10 schematically illustrates the entire sending-receiving chain in the new MAC-layer timestamping mechanism according to the principles of the present invention.

FIG. 10 schematically illustrates the entire sending-receiving chain in the new MAC-layer timestamping approach according to the principles of the present invention. In transmission-side (sending) 310, a time synchronization message is first generated and forwarded to. MAC layer 320. The time synchronization message is subsequently forwarded from MAC layer 320 to PHY layer 330. In PHY layer 330, the sending timestamp is captured right before the time synchronization message is written into TxFIFO data buffer. And then, the time synchronization message is sent out and transmitted to other nodes. In receiving side 340, the time synchronization message is first received at PHY layer 330. In PHY layer 330, the receiving timestamp is cached when a receiving SFD interrupt is created. A MPDU packet is generated with the captured timestamp as an extra field. The MPDU packet is forwarded from PHY layer 330 to MAC layer 320. In MAC layer 320, the receiving timestamp is embedded into the time synchronization message's corresponding field. Then, the time synchronization message is forwarded from MAC layer 320 to a Time Synchronization module.

We evaluated the performance of the Time Synchronization module. The results show that our MAC layer timestamping based time synchronization method supports high accuracy synchronization. We tested 1-hop, 2-hop and 3-hop synchronization accuracy with the time synchronization interval of 12 sec (Table 2). If the timer tick supports 1 us, the highest accuracy can be 9.16 us.

TABLE 2

| Synchronization Accuracy | |
| --- | --- |
| Num of Hops | Accuracy (ticks) |
| 1-hop | 9.16 tick |
| 1-hop | 14.55 tick |
| 3-hop | 15.80 tick |

Figure 11:
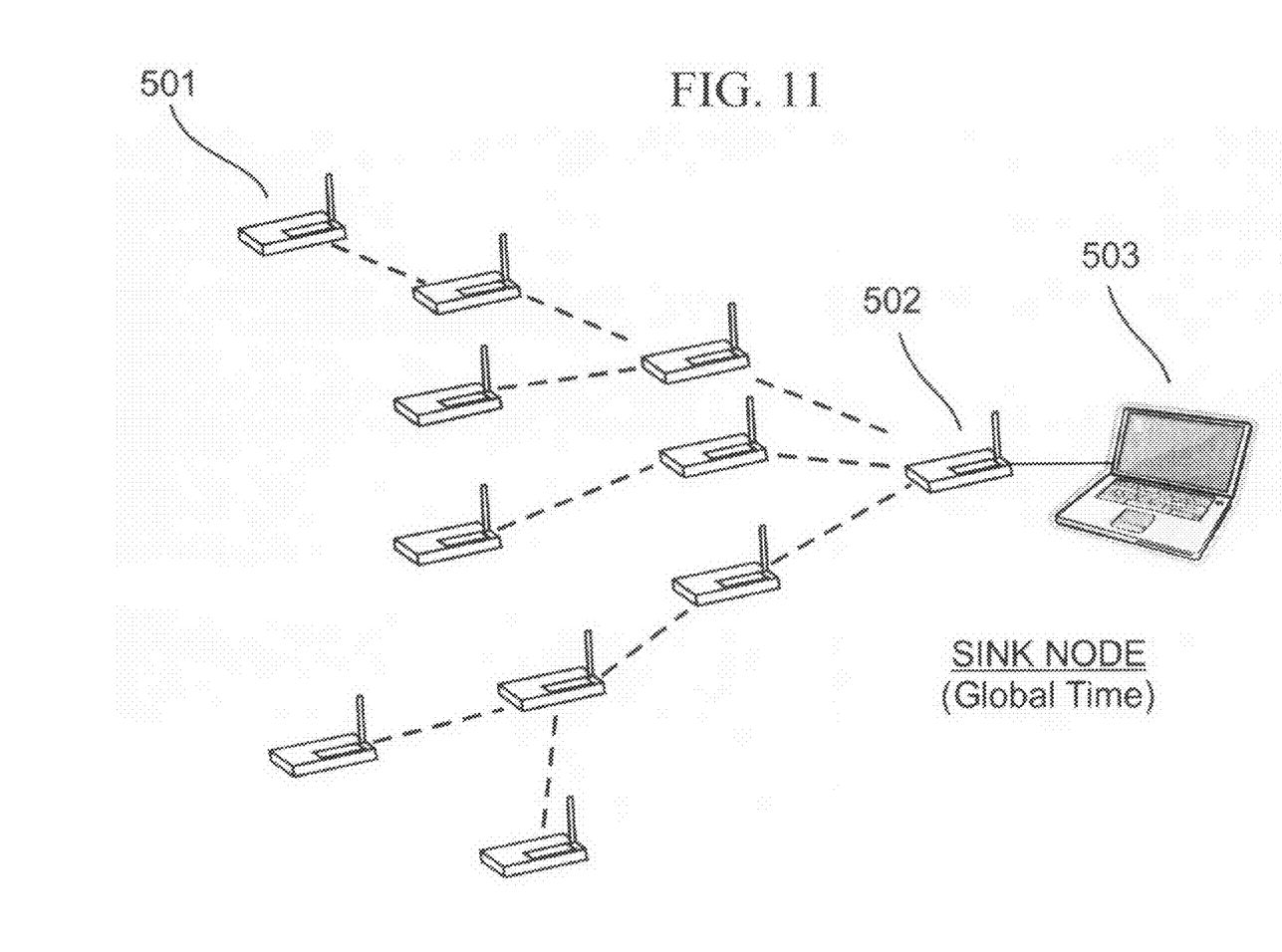
FIG. 11 schematically illustrates a system for performing a stability test.

We also performed stability test by setting up a 12-node test bed. We used 83 sec time synchronization interval and the test running period of 4 hours. FIG. 11 schematically illustrates the system used for performing the stability test. A sensor node 501 is illustrated as the wireless node with the antenna. Computer 503 monitors the testing process. For example, the computer monitors SINK node 502, which is a special sensor node that periodically sends out a synchronization message. Each sensor node in the system is run with TinyOS-2.0 IEEE 802.15.4 MAC/PHY layers and TinyOS 2.0-based UMR software system. Since the UMR software system consists of multiple modules (e.g. Time Synchronization Module, Topology Control Module, Mesh Routing Module, Data Centric Forwarding Modules), each sensor node in the system has multiple modules simultaneously running. During the whole test period, the whole system remains stable and synchronized.

Figure 12:
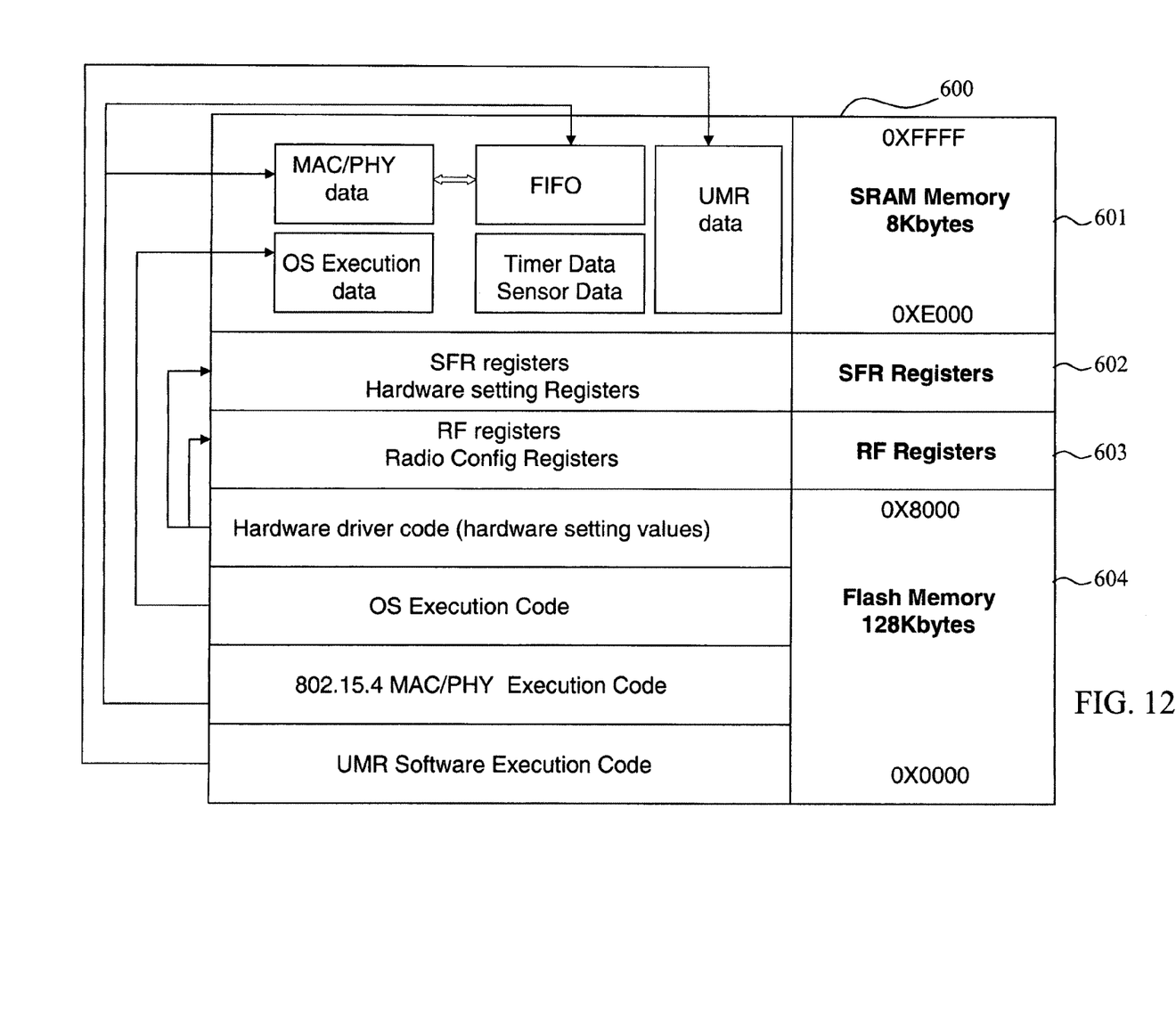
FIG. 12 schematically illustrates major components within a wireless sensor node for implementing the MAC-layer timestamping method as an embodiment according to the principles of the present invention.

FIG. 12 schematically illustrates major components within a wireless sensor node for implementing the MAC-layer timestamping method as an embodiment according to the principles of the present invention. As shown in FIG. 12, wireless sensor node 600 is constructed with a Static random access memory (SRAM) memory unit 601, a special function register (SFR) register 602, a radio frequency (RF) register 603, and a flash memory unit 604. Static random access memory (SRAM) memory unit 601 stores MAC/PHY data (the MPDU packet), Operation system (OS) execution data, FIFO data (received message), timer data (timestamp), sensor data, and UMR data. SFR register 602 stores hardware setting data. Radio frequency (RF) register 603 stores radio configuration data. Flash memory stores hardware driver code (hardware setting values), OS execution code, 802.15.4 MAC/PHY execution code, and UMR software execution code.

Our time synchronization module is the first implementation that realizes MAC layer time-stamping-based time synchronization for the WSN with the emerging 8051 platform and IEEE 802.15.4 stack. All the existing MAC layer timestamping approaches of time synchronization have only been implemented in Mica Atmel (AVR) MCU platform/Telos TI MSP430 MCU platform, and TinyOS default communication stack. Here we used a different approach from traditional MAC layer timestamping approach. No SFD signal events are specifically created for time synchronization. All the sending/receiving time-stampings are embedded and written into packets within IEEE 802.15.4 layers. Hence our MAC layer time-stamping approach has minimal overhead to the PHY/MAC layer to ensure the whole system performance and has interoperability with other modules in a large system and also ensures stability at the same time.

What is claimed is:

1. A method for communication in a wireless network, the method comprising:
receiving a message at a physical layer of a wireless sensor node, with the message comprising a Start-of-Frame-Delimiter field;
capturing a receiving timestamp at an end of receiving the Start-of-Frame-Delimiter field when a Start-of-Frame-Delimiter interrupt is created;
generating, in the physical layer, a medium access control protocol data unit packet comprising the message and a timestamping field;
inserting the captured receiving timestamp in the timestamping field of the medium access control protocol data unit packet; and
forwarding the medium access control protocol data unit packet from the physical layer of the wireless sensor node to a medium access control layer of the wireless sensor node.

2. The method of claim 1 further comprising:
determining, in the medium access control layer, whether the message in the medium access control protocol data unit packet is a time synchronization message; and
when the message in the data packet is a time synchronization message, inserting the receiving timestamp into a timestamping field of the time synchronization message, and transmitting the time synchronization message from the medium access control layer of the wireless sensor node to a Time Synchronization module of the wireless sensor node.

3. The method of claim 1 further comprising:
generating a time synchronization message in a time synchronization module of the wireless sensor node and transmitting the time synchronization message to the medium access control layer of the wireless sensor node.

4. The method of claim 3 further comprising:
forwarding the time synchronization message from the medium access control layer of the wireless sensor node to the physical layer of the wireless sensor node.

5. The method of claim 4 further comprising:
writing the time synchronization message into a transmit first in, first out (TxFIFO) data buffer, with a sending timestamp being captured and embedded into the time synchronization message immediately before the time synchronization message is written into the TxFIFO data buffer; and
transmitting the time synchronization message embedded with the sending timestamp from the TxFIFO data buffer.

6. A method for communication in a wireless network, the method comprising:
generating a time synchronization message in a time synchronization module of a wireless sensor node and transmitting the time synchronization message to a medium access control layer of the wireless sensor node;
forwarding the time synchronization message from the medium access control layer of the wireless sensor node to a physical layer of the wireless sensor node;
writing the time synchronization message into a transmit first in, first out (TxFIFO) data buffer, with a sending timestamp being captured and embedded into the time synchronization message immediately before the time synchronization message is written into the TxFIO data buffer; and
transmitting the time synchronization message embedded with the sending timestamp from the TxFIFO data buffer.

7. The method of claim 6 further comprising:
receiving a message at the physical layer of the wireless sensor node;
generating, in the physical layer, a medium access control protocol data unit packet comprising the message and a timestamping field indicating a receiving timestamp; and forwarding the medium access control protocol data unit packet from the physical layer of the wireless sensor node to the medium access control layer of the wireless sensor node.

8. The method of claim 6 further comprising:
receiving a message at the physical layer of the wireless sensor node, with the message comprising a Start-of-Frame-Delimiter field;
capturing a receiving timestamp at the end of receiving the Start-of-Frame-Delimiter field when a Start-of-Frame-Delimiter interrupt is created; and
generating, in the physical layer, a medium access control protocol data unit packet comprising the message and a timestamping field.

9. The method of claim 8 further comprising:
inserting the captured receiving timestamp in the timestamping field of the medium access control protocol data unit packet.

10. The method of claim 9 further comprising:
forwarding the medium access control protocol data unit packet from the physical layer of the wireless sensor node to the medium access control layer of the wireless sensor node.

11. A wireless sensor node in a wireless network, comprising:
a static random access memory unit comprising a transmit first in, first out (TxFIFO) data buffer; and
a flash memory unit storing instructions configured to generate a time synchronization message in a time synchronization module, transmit the time synchronization message to a medium access control layer of the wireless sensor node, forward the time synchronization message from the medium access control layer of the wireless sensor node to a physical layer of the wireless sensor node, capture a sending timestamp, embed the captured sending timestamp in the time synchronization message, write the time synchronization message into the TxFIFO data buffer, and transmit the timestamp embedded with the time synchronization message from the TxFIFO data buffer.

12. The wireless sensor node of claim 11, wherein the flash memory unit further stores instructions configured to receive a message at the physical layer of a wireless sensor node, and generate a medium access control protocol data unit packet comprising the message and a timestamping field indicating a receiving timestamp.

13. The wireless sensor node of claim 12, wherein the flash memory unit further stores instructions configured to forward the medium access control protocol data unit packet from the physical layer of the wireless sensor node to the medium access control layer of the wireless sensor node.

14. The wireless sensor node of claim 13, wherein the flash memory unit further stores instructions configured to determine whether the message in the medium access control protocol data unit packet is a time synchronization message.

15. The wireless sensor node of claim 14, wherein the flash memory unit further stores instructions configured to insert the receiving timestamp into a timestamping field of the time synchronization message when the message in the data packet is a time synchronization message, and transmit the time synchronization message from the medium access control layer of the wireless sensor node to the Time Synchronization module of the wireless sensor node.

16. A wireless sensor node in a wireless network, comprising:
a static random access memory unit comprising a transmit first in, first out (TxFIFO) data buffer; and
a flash memory unit storing instructions configured to generate a time synchronization message in a time synchronization module, transmit the time synchronization message to a medium access control layer of the wireless sensor node, forward the time synchronization message from the medium access control layer of the wireless sensor node to a physical layer of the wireless sensor node, write the time synchronization message into the TxFIFO data buffer, and transmit the timestamp embedded with the time synchronization message from the TxFIFO data buffer, with the time synchronization message including a sending timestamp captured and embedded in the time synchronization message immediately before the time synchronization message is written into the TxFIFO data buffer.

17. The wireless sensor node of claim 16, wherein the flash memory unit further stores instructions configured to receive a message at the physical layer of a wireless sensor node, and generate a medium access control protocol data unit packet comprising the message and a timestamping field indicating a receiving timestamp.

18. The wireless sensor node of claim 17, wherein the flash memory unit further stores instructions configured to forward the medium access control protocol data unit packet from the physical layer of the wireless sensor node to the medium access control layer of the wireless sensor node.

19. The wireless sensor node of claim 18, wherein the flash memory unit further stores instructions configured to determine whether the message in the medium access control protocol data unit packet is a time synchronization message.

20. The wireless sensor node of claim 19, wherein the flash memory unit further stores instructions configured to inserting the receiving timestamp into a timestamping field of the time synchronization message when the message in the data packet is a time synchronization message, and transmit the time synchronization message from the medium access control layer of the wireless sensor node to the Time Synchronization module of the wireless sensor node.

* * * * *